(No Model.) 6 Sheets—Sheet 1.
L. S. WRIGHT.
APPARATUS FOR AUTOMATICALLY LIMITING SPEED OF ELECTRIC CARS.
No. 536,055. Patented Mar. 19, 1895.
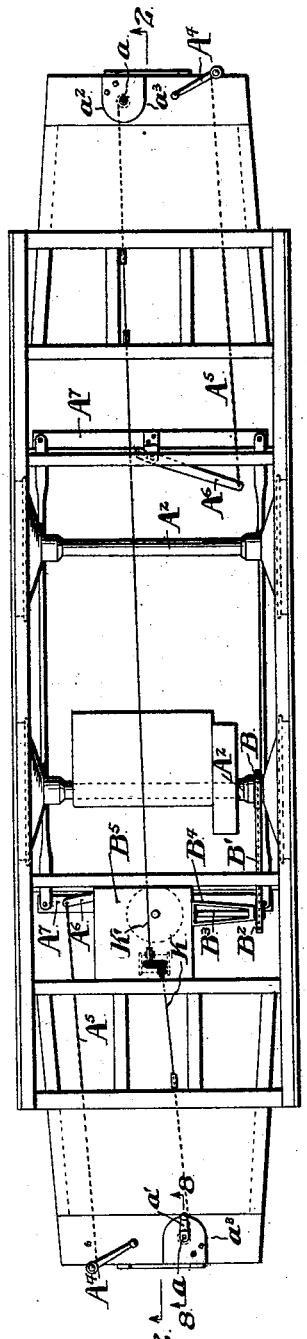
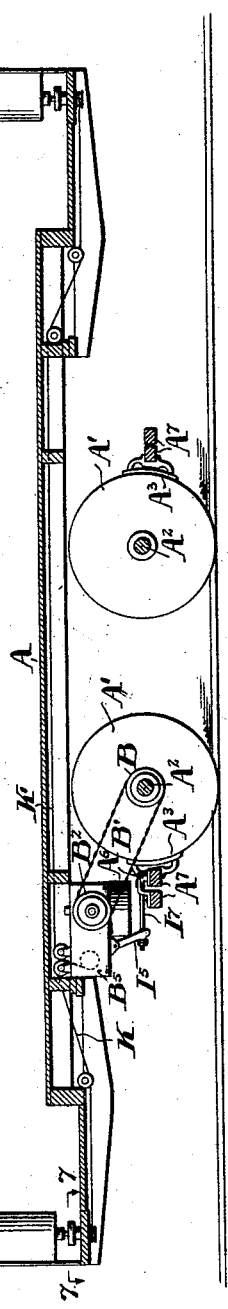
WITNESSES:
INVENTOR

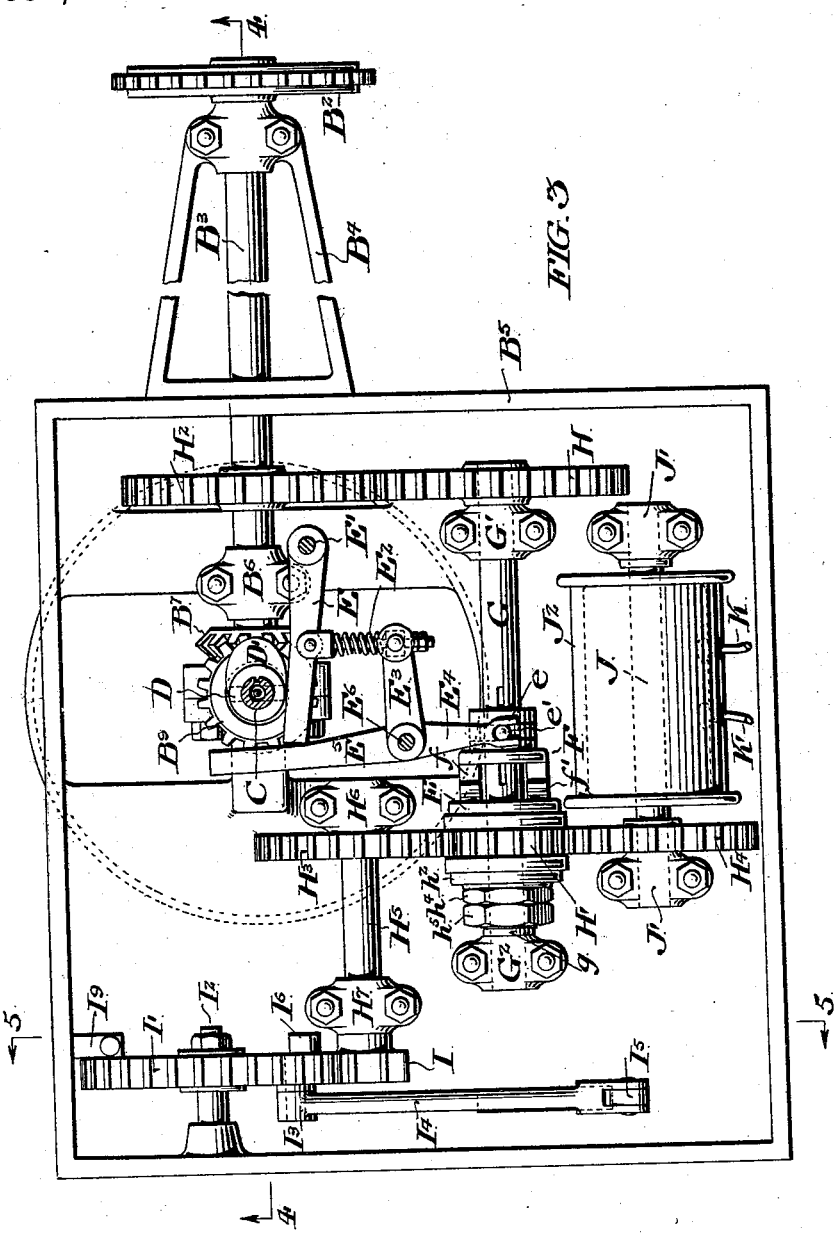

(No Model.) 6 Sheets—Sheet 3.

L. S. WRIGHT.
APPARATUS FOR AUTOMATICALLY LIMITING SPEED OF ELECTRIC CARS.

No. 536,055. Patented Mar. 19, 1895.

WITNESSES:
INVENTOR (No Model.) 6 Sheets—Sheet 4.
L. S. WRIGHT.
APPARATUS FOR AUTOMATICALLY LIMITING SPEED OF ELECTRIC CARS.
No. 536,055. Patented Mar. 19, 1895.
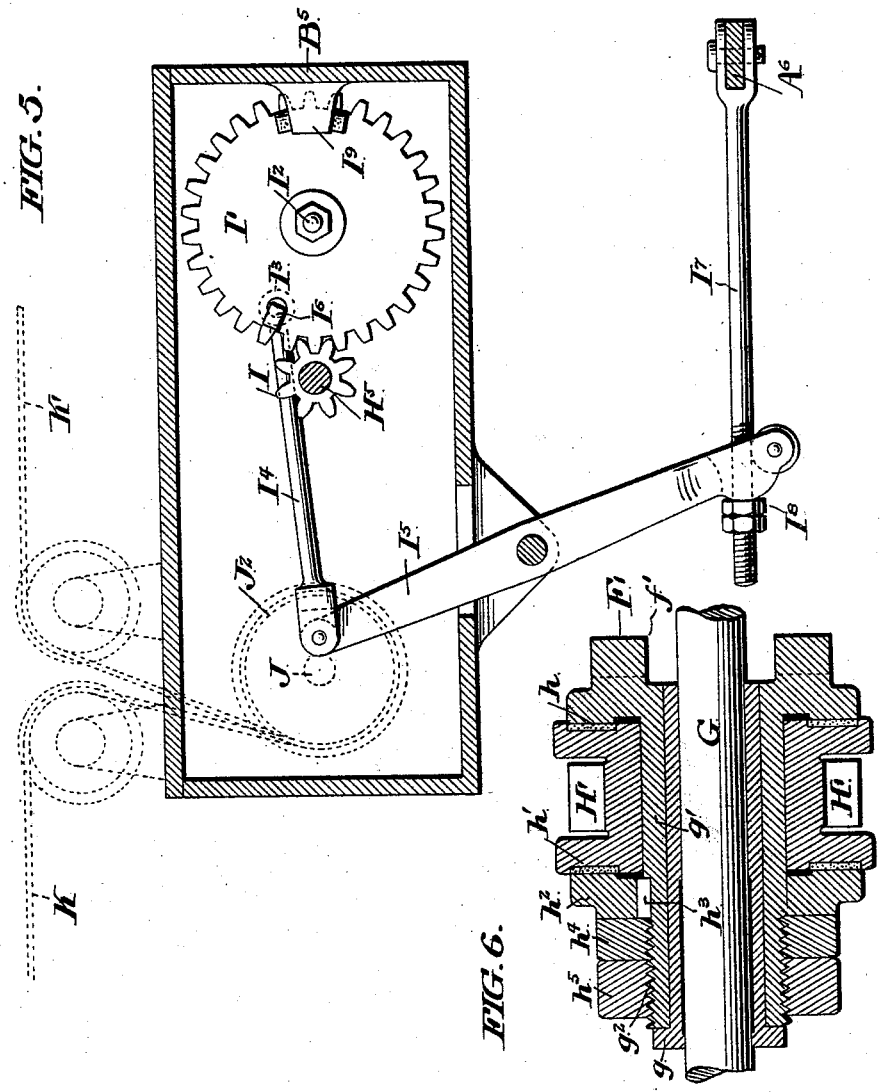

(No Model.) 6 Sheets—Sheet 5.
L. S. WRIGHT.
APPARATUS FOR AUTOMATICALLY LIMITING SPEED OF ELECTRIC CARS.
No. 536,055. Patented Mar. 19, 1895.

(No Model.) 6 Sheets—Sheet 6.

L. S. WRIGHT.
APPARATUS FOR AUTOMATICALLY LIMITING SPEED OF ELECTRIC CARS.

No. 536,055. Patented Mar. 19, 1895.

WITNESSES:
James H. Bell
Randolph Sailer

INVENTOR
L. S. Wright
By W. C. Raley
Attorney

THE NORRIS PETERS CO., PHOTO-LITHO., WASHINGTON, D. C.

UNITED STATES PATENT OFFICE.

LOUIS S. WRIGHT, OF PHILADELPHIA, PENNSYLVANIA.

APPARATUS FOR AUTOMATICALLY LIMITING SPEED OF ELECTRIC CARS.

SPECIFICATION forming part of Letters Patent No. 536,055, dated March 19, 1895.

Application filed December 8, 1894. Serial No. 531,226. (No model.)

*To all whom it may concern:*

Be it known that I, LOUIS S. WRIGHT, of Philadelphia, in the State of Pennsylvania, have invented a certain new and useful Apparatus for Automatically Limiting the Speed of Electric Cars, whereof the following is a specification, reference being had to the accompanying drawings.

The primary object of my invention is to afford means whereby when the running speed of an electric car attains a predetermined limit, the brakes shall be applied and the current simultaneously cut off, or diminished, so as to arrest, or slow down, the movement of the car, and require the attention of the motorman to re-establish the normal running.

Secondary objects of the invention relate to the convenient combination of the necessary mechanism with cars of ordinary build, and to details which enhance the proper working of the apparatus.

In the accompanying drawings I have shown a preferred type of the apparatus as applied to an ordinary trolley car.

Figure 4:
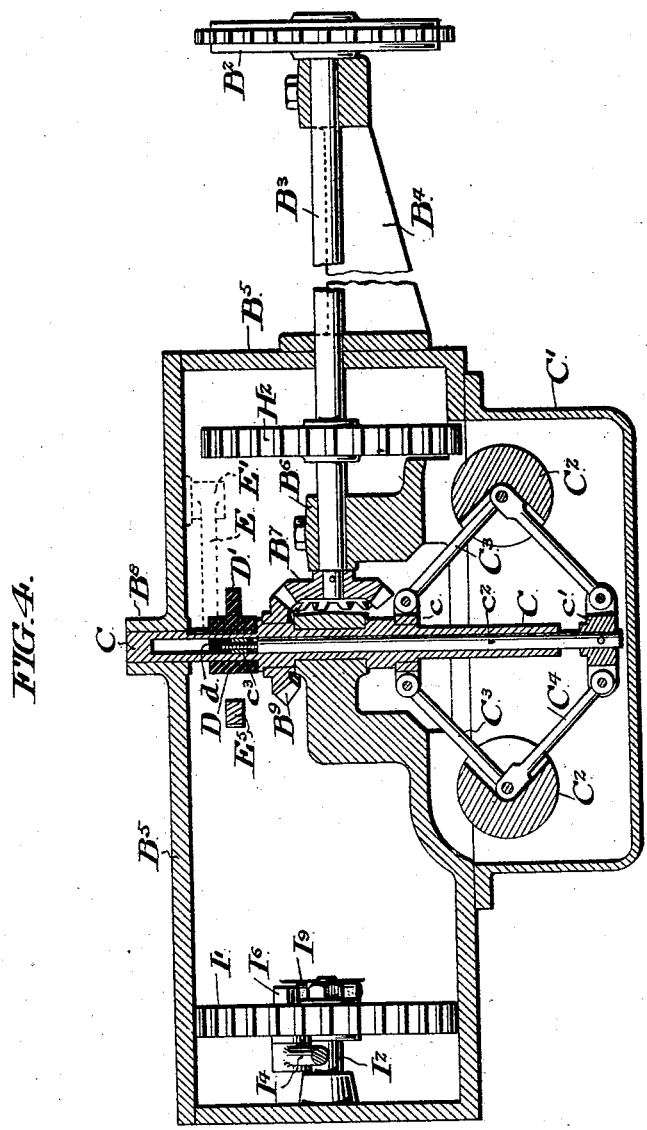
Figure 7:
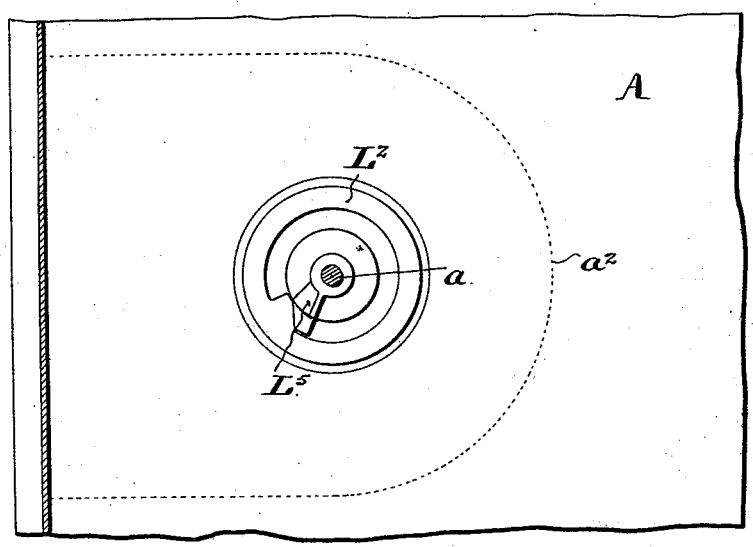
Figure 8:
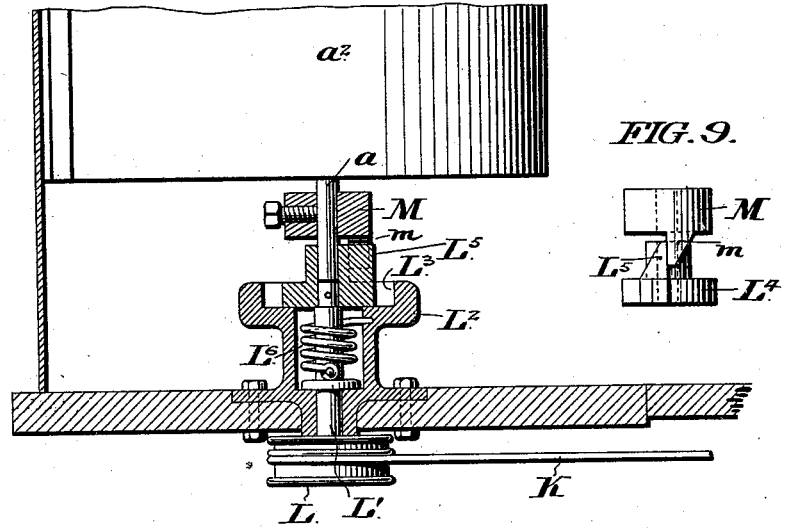
Figure 9:
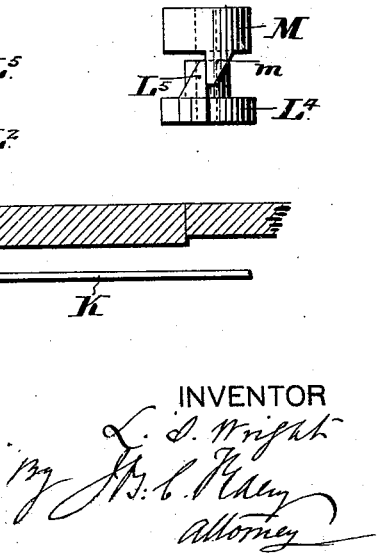
Figure 10:
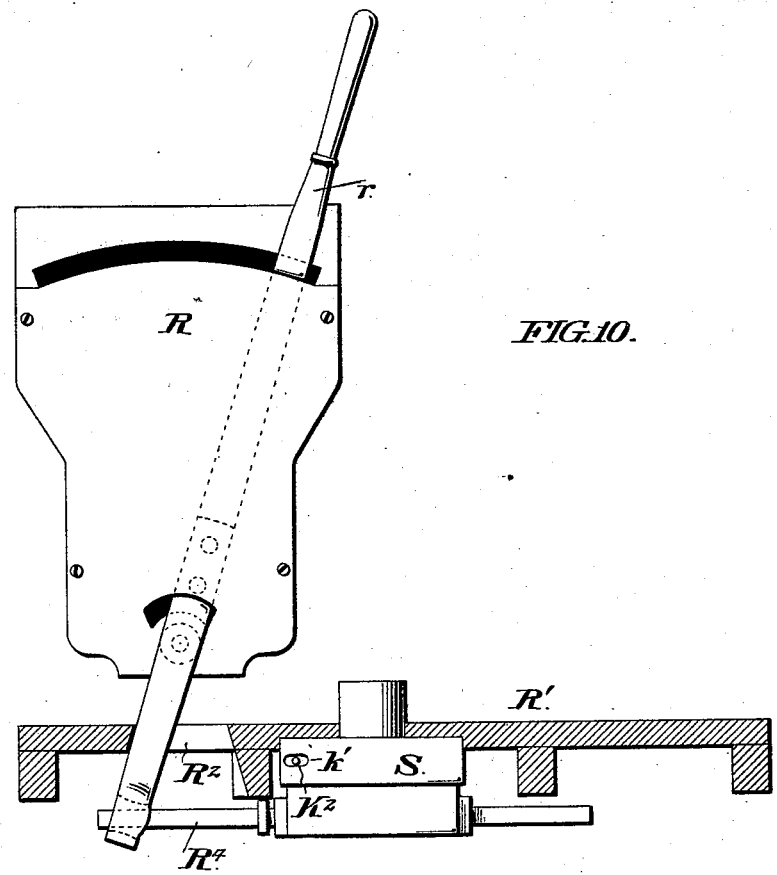
Figure 11:
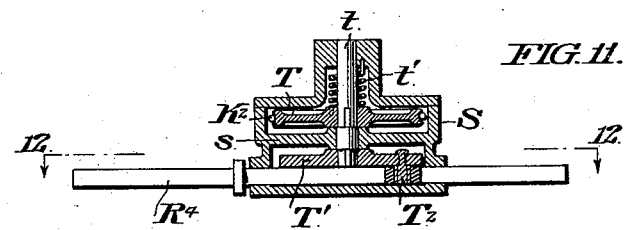
Figure 12:
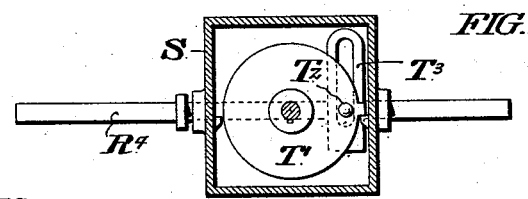

In said drawings, Figure 1 represents a top or plan view of the car truck and subjacent parts comprising my invention, the body of the car being removed. Fig. 2 is a vertical longitudinal section, upon the line 2, 2, of Fig. 1. Fig. 3 is a top or plan view, on an enlarged scale, of the main group of the devices by which the control above referred to is effected, the top of the casing which contains said group being removed and the vertical shafts being represented in transverse section. Fig. 4 is a vertical central section through the governor proper, and adjacent parts, on the line 4, 4, of Fig. 3. Fig. 5 is a vertical section on the line 5, 5, of Fig. 3. Fig. 6 is a central longitudinal section, on a still further enlarged scale, through the clutch by which the governing mechanism is thrown into or out of engagement with the direct actuating mechanism of the brakes and current controlling devices. Fig. 7 is a horizontal section through a portion of the current controlling device, on the line 7, 7, of Fig. 2; and Fig. 8 is a correspondingly enlarged vertical section through the same parts, on the line 8, 8, of Fig. 1. Fig. 9 is a detail view of certain parts shown in Fig. 8. Figs. 10, 11 and 12, represent a modification of the apparatus intended for use in connection with a structure where the prime-mover of the controller is a reciprocating lever instead of a rotating shaft. Fig. 10 is a front elevation of the controller box and its lever, showing the platform in vertical section and the casing of the immediately subjacent mechanism for shifting the controller lever in side elevation. Fig. 11 is a vertical central section through said casing, and Fig. 12 is a horizontal section through the same on the line 12, 12, of Fig. 11, looking in the direction of the arrows.

Referring to the general views of Figs. 1 and 2, A indicates the base-frame of the car, having at each end the usual projecting supports for the platforms, whose construction is well understood. The wheels of the cars are indicated at $A'$, and the axles thereof at $A^2$. At each end of the car I have indicated at $a^3$, an ordinary form of electric switch and resistance apparatus, generally called the "controller," whereby the motor-man is enabled, by turning a vertical shaft, to throw the current on to the motor with varying degrees of intensity, or cut it off entirely. The details of this device, being well known in the art, need not be described, as it is only important for the present purpose to state that the control is effected by means of a rotatable vertical shaft, $a$, having a hand lever, $a'$, and extending downward through a cylindrical casing, $a^2$, mounted upon the platform. It is characteristic of this class of controlling devices now generally used, that the hand lever and its shaft, $a$, are rotatable through substantially seven-eighths of a complete circle, the remaining segment, of say forty-five degrees, being a blank or idle space through which the handle does not travel. The significance of this idle segment will be hereinafter noted.

For convenience of nomenclature, I shall hereinafter designate the group of mechanism (whether of the type just indicated or any generally similar type) as the "controller system," and the direct actuating member of such group (in this instance the shaft, $a$,) as the "prime mover" thereof.

The car wheels, $A'$, are provided with the usual brake system, capable of actuation from the front or rear platform, and comprising hand levers, $A^4$, connected by chains, $A^5$, with lever arms, $A^6$, which are in turn operatively connected with the movable frames, $A^7$. Said frames are adapted to force the brake-shoes, $A^3$, upon the periphery of the wheels, $A'$, against the tension of springs, (not shown,) so that when the hand-levers are released by the brake-man, the shoes are automatically thrown clear of the wheels. It is not necessary for the purpose of my invention to describe these devices in detail, as they are in common use, the only important feature thereof in this connection being found in the fact that a lever, or other moving member, is operatively connected with the brake-frames in such manner that its positive movement in one direction shall put on the brakes, and the release thereof shall permit the brake-springs above mentioned to throw off the brakes and reshift the said lever to its ordinary position. The lever referred to is indicated by the letter, $A^6$, a pair of these levers being of course ordinarily applied, so as to permit direct control of the brakes from each end of the car.

I shall hereinafter designate the group of mechanism, whereby the brakes are thus applied and automatically thrown off when released, as the "brake-system" and the lever, $A^6$, or other moving member, which directly actuates the brake-frame, as the "prime-mover" thereof.

I will now proceed to describe the group of mechanism by which, in my invention, an automatic command of both the brake-system and controller-system is attained.

Upon one of the car axles, $A^2$, is a sprocket wheel, B, which communicates by means of a chain belt, $B'$, with a second sprocket wheel, $B^2$, upon the end of a horizontal shaft, $B^3$, having a bearing in a laterally projecting bracket, $B^4$, mounted upon one side of the casing, $B^5$, which incloses the main group of devices now about to be described. Said casing, $B^5$, may be conveniently supported upon the under side of the base frame, A, near one end thereof, sufficient space being usually found between the axle and the platform. The shaft, $B^3$, extends inward through the casing, $B^5$, and is provided with an interior bearing, $B^6$. (See Fig. 3.) Said shaft projects through said bearing and terminates in a bevel gear, $B^7$, which engages (see Fig. 4) with a corresponding gear, $B^9$, mounted at the end of a vertical hollow shaft, C. The shaft, C, (which is the governor-shaft) has an upper bearing at $B^8$, in the top of the casing, $B^5$, and has a lower bearing in a rib which is integral with the bottom of the casing, said portion of the bottom being, however, dished inward or raised above the general plane of the bottom portion of said box, as indicated in the sectional view of Fig. 4. After passing through said bearing, the shaft, C, projects below the bottom of the casing, $B^5$, into a depending circular casing, $C'$, which contains the governor.

I have shown a preferred type of centrifugal governor in connection with the apparatus, but of course do not limit myself thereto. Said governor consists of the balls, $C^2$, carried by the jointed arms, $C^3$, $C^4$; the upper arms, $C^3$, being hinged to a collar, $c$, rigidly mounted upon the shaft, C, while the lower arms, $C^4$, are hinged to a collar, $c'$, rigidly attached to a vertically movable rod, $c^2$, which is adapted to slide longitudinally within the hollow shaft, C. This group of devices, being well known in connection with centrifugal governors, need not be more particularly described.

At the upper end of the sliding rod, $c^2$, is a radially projecting lug, $c^3$, which extends outward through a longitudinal slot, $d$, formed through the side of the hollow shaft, C, the length of said slot being such as to permit the longitudinal movement of the rod and lug with reference to said shaft. Said lug projects through the slot, $d$, and beyond the periphery of the shaft, C, to an extent sufficient to engage with a collar, D, mounted upon the exterior of the shaft, C. This collar is permitted to slide longitudinally, but is locked against rotation with reference to the shaft, C, by means of a spline or feather, and carries upon its exterior periphery a cam, $D'$, which is shown in plan view in Fig. 3.

It will be seen that by reason of the play which the lug, $c^3$, has in the slot, $d$, the collar, D, and its cam, $D'$, can be shifted from one horizontal plane to another and that such movement is attained by the longitudinal thrust of the shaft, $c^2$, in correspondence with the action of the centrifugal governor. At a horizontal plane which is within the range of movement of the cam, $D'$, though out of its normal plane of rotation, I mount a horizontal lever, E, which has its fulcrum at $E'$, and which is connected by means of a pivoted rod, $E^2$, with one arm, $E^3$, of a double bell-crank lever, whose other arms are indicated at $E^4$, $E^5$, said bell-crank having its fulcrum at $E^6$. The outer end of the arm, $E^4$, is bifurcated, as indicated at $e$, to embrace a stud, $e'$, which is mounted in the shifting member, F, of a clutch coupling, the correlative or non-shifting member being shown at $F'$. This clutch may be of any of the well known types, but I have indicated the two members as capable of engagement by means of opposing studs, $f$, $f'$. The shifting member, F, of the clutch, slides longitudinally upon the shaft, G, which has bearings, $G'$, $G^2$, mounted upon the bottom of the casing, $B^5$. Said shaft carries at one end a gear, H, rigidly mounted thereon, and at the other end (adjacent to the coupling) a freely mounted pinion, $H'$. The pinion, $H'$, is frictionally connected with the non-shifting member, $F'$, of the coupling, by means of the device illustrated on an enlarged scale in Fig. 6. The shaft, G, is preferably surrounded by a bushing, $g$, upon which fits snugly a sleeve, $g'$, with which the non-shifting member, $F'$, of the coupling is integral. The outwardly projecting end of said sleeve, $g'$, is threaded as indicated at $g^2$. The pinion, $H'$, is freely mounted upon the exterior of said sleeve, $g'$, and the sides of the pinion are provided with annular recesses which contain bands of frictional material, such as vulcanized fiber, indicated at $h, h'$. The friction band, $h$, is in direct contact with an annular projecting face upon the inner side of the non-shifting member, $F'$, of the coupling. The other friction band, $h'$, is in contact with the projection upon the inner face of a ring, $h^2$, which fits snugly upon the sleeve, $g'$, being keyed thereto as indicated at $h^3$. Beyond said ring, $h^2$, and upon the threaded portion, $g^2$, of the sleeve, $g'$, are jam nuts, $h^4$, $h^5$, by means of which the friction bands, $h$, $h'$, may be clamped with any desired degree of compression against the side of the pinion, $H'$, and set, so that said pinion shall engage with the sleeve, $g'$, with a predetermined frictional hold, and shall slip when such hold is exceeded.

It will thus be seen that by the shifting of the clutch in correspondence with the movement of the bell-crank arm, $E^4$, frictional engagement between the shaft, $G$, and pinion, $H'$, can be effected, the limit of such engagement however being determined by friction, and not being absolutely positive. The pinion, $H'$, meshes with two gears, $H^3$, $H^4$, one of said gears, $H^3$, being the direct actuating device for the prime-mover of the brake-system, and the other of said gears, $H^4$, being the direct actuating device of the prime-mover of the controller-system. I will now proceed to describe the operation of such actuating device upon the former of these systems.

The gear, $H^3$, is mounted upon the shaft, $H^5$, which has its bearings at $H^6$, $H^7$. The shaft, $H^5$, carries at its end a pinion, $I$, which engages with a gear, $I'$, turning upon a stud, $I^2$, which is mounted upon the inner face of the casing, $B^5$. Said gear, $I'$, is provided with a wrist-pin, $I^3$, to which is pivoted a connecting rod, $I^4$, attached to the lever, $I^5$. Said lever is bifurcated at its outer end and embraces the rod, $I^7$, which is attached to the prime-mover of the brake-system, to wit: the brake-lever, $A^6$, in such manner that the shifting of the lever, $I^5$, shall, by pulling up the rod, $I^7$, throw on the brake. The position of the rod, $I^5$, with reference to the rod, $I^7$, may be adjusted by means of the jam nuts, $I^8$. Upon the side of the gear, $I'$, directly opposite to the wrist-pin, $I^3$, is a lug, $I^6$, which is adapted to bring up against a stop, $I^9$, upon the casing and arrest rotation of the gear, $I'$, when this point is reached. It will thus be seen that when the engagement of the clutch couplings, $F$, $F'$, before referred to, brings the rotating shaft, $G$, into operative connection with the pinion, $H'$, the rotation of said pinion will, (through the gear, $H^3$, pinion, $I$, and gear, $I'$,) actuate the connecting rod, $I^4$, and lever, $I^5$, and shift the brake lever, $A^6$.

The operation of the actuating device upon the prime-mover of the controller-system is as follows: The gear, $H^4$, which is actuated from the pinion, $H'$, is mounted upon a shaft, $J$, having bearings, $J'$, on the bottom of the box, $B^5$. Said shaft, $J$, carries a drum, $J^2$, to which are connected flexible cords, $K$, $K'$, preferably of small wire rope, which are adapted to be wound upon the exterior periphery of the drum by its rotation. Said cords lead to the controller at either end of the car, and as the arrangement is similar at the respective ends, only one thereof will be described.

Referring to Fig. 8, the cork, $K$, is seen to be attached to a small drum, $L$, which is rigidly mounted upon the end of a shaft, $L'$, arranged beneath and in line with the shaft, $a$, (which is the prime mover) of the controller. The shaft, $L'$, has its bearing in a cylindrical standard, $L^2$, whose upper face is a depression, $L^3$, which is adapted to contain a rotatable collar, $L^4$, keyed to the shaft, $L'$, and carrying an upwardly projecting lug, $L^5$. The controller shaft, $a$, extends down into but runs freely within said collar, $L^4$, and is provided with a rigidly attached collar, $M$, which has a downwardly depending stud, $m$, arranged in operative relation to the lug, $L^5$, so that rotation of the collar, $L^4$, will by engagement between the two lugs, rotate the collar, $M$, and shaft, $a$, through an arc not exceeding seven-eighths of a circle. This rotation is of course effected by the winding of the cord, $K$, upon the drum, $J^2$, and corresponding unwinding thereof upon the small drum, $L$. A spring, $L^6$, attached to and coiled upon the shaft, $L'$, and also attached to the standard, $L^2$, normally tends to rewind the cord, $K$, upon the drum, $L$, whenever the drum, $J^2$, is rotated to unwind the cord, $K$, therefrom. The normal position of the lug, $L^5$, is in the idle segment of rotation of the controller shaft, $a$, and no matter where the lug, $m$, (which is connected with the controller shaft) may be, the lug, $L^5$, will pick up and carry it toward a position which corresponds with zero of the current.

The general operation of the apparatus is as follows: The governor being properly adjusted for a given rate of rotation, the cam, $D'$, which is under the direct control thereof, revolves in a plane or planes below that of the lever, $E$, during what may be called the normal rate of speed of the car. This position of the parts is shown in Figs. 3 and 4. As soon however as the normal limit of speed is exceeded the balls of the governor, by flying outward, actuate the rod, $c^2$, and raise the cam, $D'$, into a plane of rotation where it engages with the lever, $E$, and immediately shifts said lever, so as to throw the clutch coupling, $F$, $F'$, into engagement. Thereupon the shaft, $G$, (which has been of course constantly though idly rotating,) becomes operatively connected with the pinion, $H'$, and actuates on the one hand the gear, $H^3$, and on the other hand the gear, $H^4$. The former of these gears, $H^3$, through the pinion, $I$, gear, $I'$, rod, $I^4$, and lever, $I^5$, pulls upon the rod, $I^7$, and shifts the brake lever, $A^6$, toward the left in Fig. 5, thus putting on the brakes. The latter gear, $H^4$, winds up the cords, $K$, $K'$, upon the drum, $J^2$, and through the action of the drum, L, and rotating stud, L⁵, turns the controller-shaft back toward zero, thus simultaneously shutting off the electric current. As soon as the brake-shoes, A³, bring up hard against the surface of the wheels, A', the frictional engagement between the sleeve, $g'$, and pinion, H', is overcome and said pinion slips upon the sleeve. Should this result fail to occur, however, the lug, I⁶, will bring up against the stop, I⁹, and act as a positive check to further movement. The car of course stops or slows down, and the balls of the governor fall inward, thus retracting the cam, D', from the plane of engagement with the lever, E. Upon the return of the cam, D', to its normal plane, it strikes against the other arm, E⁵, of the bell-crank, which is in a plane below that of the lever, E, (as shown in Fig. 4,) and throws it radially outward, thus retracting the shifting member, F, of the clutch coupling from engagement with the non-shifting member, F', thereof, so that the pinion, H', ceases to be operatively connected with the shaft, G. The brakes are thereupon released and their automatic retracting spring, before referred to, throws the shoes away from the wheels. This movement shifts the brake-lever, A⁶, back to its former position, and by so doing reverses the movement of the groups of actuating devices, both of the brake-system and controller-system, as follows: The brake-lever, A⁶, pulls upon the rod, I⁷, and through the lever, I⁵, pulls upon the rod, I⁴, thus reversing the revolution of the gear, I', and returning it to the initial position, shown in Fig. 5. The stop, I⁸, prevents the gear, I', from getting upon a dead center with relation to the pull of the rod, I⁴, so that the efficient action of the returning mechanism is insured. The same reverse movement of the gear, I', actuates the drum, J², in the direction proper to unwind the cords, K, K', therefrom, and thereupon the spring actuated drums, L, rewind the cords upon their periphery.

R indicates the controller box, and $r$ the hand lever thereof, by the shifting of which the current is turned on and off, or modified. Said lever is prolonged down below the level of the car platform, R', through a slot, R², to the end of a horizontally movable rod, R⁴. Said rod slides horizontally in a way formed through the bottom of the casing S, which casing is rectangular in form, as indicated in Fig. 12, and is divided into upper and lower compartments, as shown in Fig. 11, by means of the partition, $s$. In the upper portion of the casing, and above said partition, a disk, T, is mounted upon a shaft, $t$, which rotates therewith, a spring, $t'$, being coiled about said shaft and connected respectively with the disk and the casing, as shown. The shaft, $t$, extends down below the partition, $s$, and carries a rigidly attached disk, T', having a wrist-pin, T², extending downward and engaging in a slotted arm, T³, which is rigidly connected to or made integral with the sliding rod, R⁴, so that rotation of the disk, T', will cause longitudinal reciprocation of said rod. A cord, K², entering through a slot, $k'$, in the upper portion of the casing, S, is attached to the periphery of the disk, T, said cord being the counterpart of the cord, K, before described, by means of which the controller shaft is rotated in the first described type of my invention. Assuming said cord to be connected with the actuating mechanism under the command of the governor, in a similar manner to that previously described, it will be seen that the reciprocation of the controller shaft would be effected and the current shut off or diminished at substantially the same time as the brakes were applied, the result of the whole operation being analogous to that previously described.

The foregoing are typical embodiments of my invention, but I wish it to be understood that I do not limit myself to the specific construction of parts indicated in the various groups of mechanism which constitute the main operative elements, as it is obviously within the range of ordinary mechanical skill to vary, for instance, the form of the governor, or of the mechanism which actuates the prime movers of the brake and controller systems, or of the engaging device by which the governor is enabled to command said actuating mechanism, as well as other subordinate features.

Among the conditions, which are important in electric locomotive devices, is the fact that if the brakes are applied, without shutting off or reducing the current which is operative upon the motor system, there is great danger of burning out the armatures, or other parts of the motor. To this end, the automatic command of the brake system should be so related to that of the controller system, that the putting on of the brake shall be attended by a reduction or shutting off of the current of the motor, in so far as the same tends to run the car against the holding action of the brakes. While, therefore, the current might without danger be shut off before the brakes are applied, I believe it to be highly desirable that the converse of this should be provided against, and that the application of the brakes should be either simultaneous with, or not substantially precede, the cessation or diminution of the current.

It is also desirable that there should be at some point in the train of mechanism, between the brake and controller system, on the one hand, and the primary source of power for the actuating mechanism thereof, on the other, a point where a frictional engagement, instead of a positive one, is employed. Otherwise, unless the action of the devices is very carefully regulated, or the parts provided with some form of compensation, there might be danger of injury should the car fail to stop when the practical limit of tension of the brakes, or of movement of the controller mechanism, had been attained. I have thought it best to locate this point of frictional engagement at or near the clutch which is controlled by the governor, but obviously it would operate in the same manner if located at any point between the primary source of power, (in this instance the car axle,) and the ultimate members of the systems which it is intended to actuate. Hence I do not limit myself to the exact location above specified for this frictional engaging device.

In cases where the prime-mover of the brake system is an absolutely separate device from the prime-mover of the controller system, the intervention, between the primary source of power and these local prime-movers, of two groups of actuating mechanism, one directly operative upon each system, is the most obvious, and I believe the most practicable embodiment of my invention; but at the same time such subdivision into two groups is not essential. Thus, when the prime-movers of the brake system and of the controller system are inter-connected, as, for instance, in the device shown in Letters Patent No. 525,336, dated September 4, 1894, or in any case where the movement of a common member is operative upon both the controller system and the brake system, a single group of actuating mechanism commanded by the governor and operatively connected with such common member, would be sufficient for the purposes of my invention. When, moreover, an electric brake system is employed, (such for instance as that shown in Letters Patent No. 330,605, dated November 17, 1885,) and the same local prime mover which shuts off or diminishes the current, is utilized to turn on the current to the brake system, it is equally obvious that the employment of two groups of intermediate actuating mechanism, between the governor and such local prime-mover, would be superfluous. Hence when in my claims I use the term actuating mechanism as comprehending the devices intermediate (in the train of mechanical operations) between the primary source of power and the local prime-mover or prime-movers aforesaid, I do not imply that a plurality of groups of such intermediate actuating mechanism is essential, but mean to include such actuating mechanism, whether it be arranged in separate groups individually connected with said local prime-movers, or in a single group, common to both.

I use the term electric car as comprehending generally any electrically actuated locomotive vehicle.

Having thus described my invention, I claim—

1. In an electric car, comprising a motor, a controller system and a brake system, the combination of a governor; means substantially as set forth for driving the same in conformity with the speed of movement of the car; actuating mechanism substantially as set forth; a primary source of power for driving said actuating mechanism; and an engaging device operated by the governor and commanding the connection between the primary source of power for said actuating mechanism, and the controller and brake systems, substantially as described.

2. In an electric car, comprising a motor, a controller system and a brake system, the combination of a governor; means substantially as set forth for driving the same in conformity with the speed of movement of the car; actuating mechanism, substantially as set forth, operatively connected with the brake and controller systems; means, substantially as set forth, for driving said actuating mechanism from the running of the car; an engaging device, operated by the governor, and commanding the connection between the primary source of power for said actuating mechanism and the controller and brake systems; and a frictional connection located in the train of mechanism between said primary source of power and the controller and brake systems, as and for the purposes specified.

LOUIS S. WRIGHT.

Witnesses:
JAMES H. BELL,
G. HERBERT JENKINS.